CIRCUIT ARRANGEMENT FOR AUTOMATIC TELEPHONE SYSTEMS WITH DIFFERENT KINDS OF TELEPHONE COMMUNICATIONS

Filed Nov. 20, 1963

INVENTOR.
LENNART UNO OLANDER
BY Hane and Nydick
ATTORNEYS

United States Patent Office 3,310,630
Patented Mar. 21, 1967

3,310,630

CIRCUIT ARRANGEMENT FOR AUTOMATIC TELEPHONE SYSTEMS WITH DIFFERENT KINDS OF TELEPHONE COMMUNICATIONS

Lennart Uno Ölander, Hagersten, Sweden, assignor to Telefonaktiebolaget L M Ericsson, Stockholm, Sweden, a corporation of Sweden Filed Nov. 20, 1963, Ser. No. 325,098
Claims priority, application Sweden, Dec. 7, 1962, 13,227/62
4 Claims. (Cl. 179—8)

The present invention relates to a circuit arrangement for automatic teelphone systems for establishing different kinds of telephone communications in dependence on a marking circuit that is individual to a called subscriber, said telephone communications being connected by means of the calling number of the called subscriber. The invention further relates to automatic telephone exchanges with registers that register the number of the called subscriber and which set by means of markers the selecting means comprised in the communications.

Within telephone systems there arises at times the desire to be able to connect calls to determine subscriber's numbers, to some other calling number, for example a telephone operator or an announcing machine. At times the desire exists that the call should be charged to the subscriber's meter of the called subscriber instead of, as is normal, be charged to the subscriber's meter of the calling subscriber.

According to the invention the desires set forth are attained by means of sencing means in the marker that controls the selecting means located nearest the called subscriber. These sensing means sense and are actuated by the marker, and send a voice frequency signal backwards to that of the registers which establishes the connection. By means of a voice frequency signal receiving means in the register and in dependence on this revertive voice frequency signal the connection is transformed from a normal telephone communication directed to the called number, to a particular telephone communication.

The invention will be described more closely below with reference to the enclosed drawings, FIG. 1 and FIG. 2.

Figure 1:
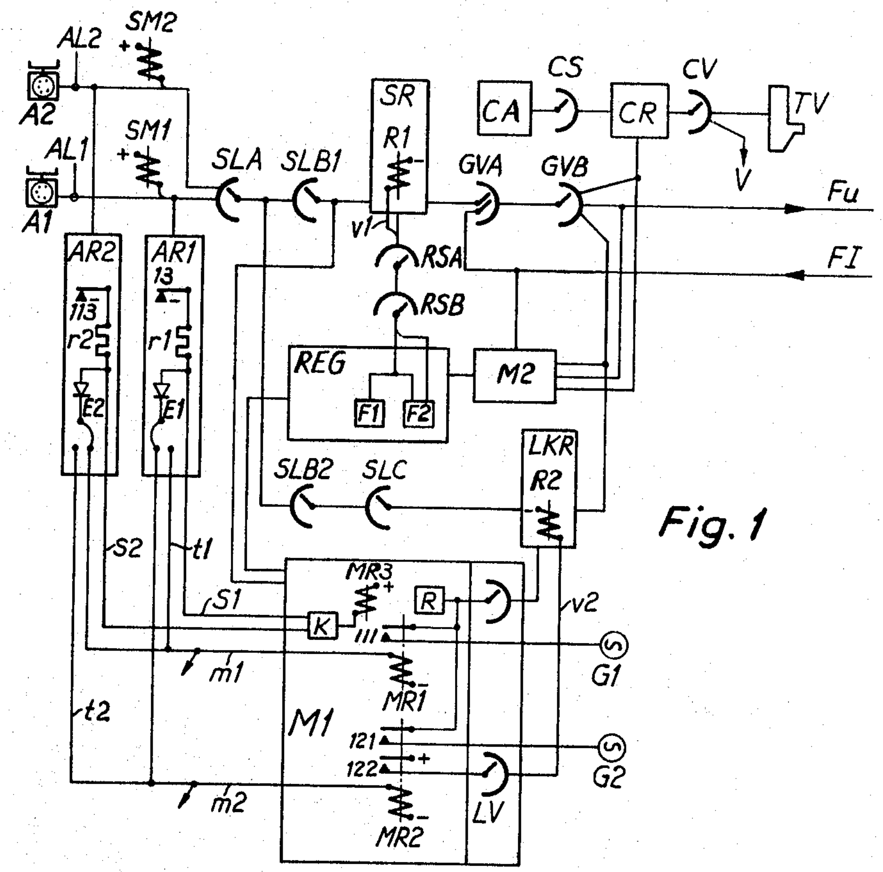
FIG. 1 shows a general layout of a telephone system according to the invention.

In FIG. 1, A1 and A2 are subscriber's instruments, each provided with a subscriber's line AL1 and AL2 respectively, and AR1 and AR2 are their respective subscriber's line equipments. Furthermore there is a subscriber's meter SM1 and SM2 respectively for each subscriber. The subscriber's lines AL1 and AL2 respectively are connected to primary selectors SLA which in turn are connected to secondary selectors SLB1 for outgoing traffic and SLB2 for incoming traffic to the subscriber's instruments. Each of the selectors SLB1 is connected with a relay set SR and a group selevtor GVA. The selectors SLB2 are connected through selectors SLC to relay sets LKR for incoming traffic. The relay sets SR are connected by means of register selectors RSA, RSB to registers REG, and by means of group selectors GVA and GVB to the relay sets LKR, outgoing junction lines FU as well as to relay sets CR, the purpose of which will be described in connection with the selectors CS and CV, the translator CA and equipments TV and V.

FIG. 1 shows furthermore incoming junction lines FI, a marker M2 of the group selector stage GVA, GVB and a marker M1 of the selector stage located nearest the subscriber's lines when calling to the subscriber's lines AL1, AL2. This selector stage comprises selectors SLC, SLB2 and SLA. In the marker M1 there are relays MR1–MR3, a registering means R, a circuit arrangement K, selectors LV and voice frequency generators G1 and G2 for two different voice frequencies. In the register REG there are voice frequency receivers F1 and F2 for signals which are sent by alternating current from voice frequency generators G1 and G2.

The telephone system according to FIG. 1 functions in the following manner. Upon a call from the subscriber's instrument A1 the line AL1 is connected through the selectors SLA, SLB1, a relay set SR and the selectors RSA, RSB to a register REG. When a dialing tone is obtained from the register, the number of a called subscriber's line, for example AL2, will be dialed. The number is registered in the register. The register connects itself to the marker M2 which, by means of signals from the register, selects a free relay set LKR belonging to the subscriber's group to which the called subscriber's line belongs. Then the marker M2 connects a connection between the relay sets SR and LKR by means of the group selector means GVA, GVB.

When the relay set LKR is busy it calls the marker M1 and is connected thereto by means of the connecting selector LV of the marker. From the register, signals are then sent through units RSB, RSA, SR, GVA, GVB, LKR and LV to the registering means R of the marker M1. By means of the circuit arrangement K which is controlled registering means by R, the test relay MR3 of the marker M1 is connected to the test wire of the called line, for example *s2* of the line AL2. If the contact 113 is closed, the line AL2 is free and the relay MR3 operates in the following circuit: voltage +, the winding of relay MR3, circuit arrangement or network K, line *s2*, resistance *r2*, and contact 113 to a negative voltage (—).

However, it is here assumed that the called subscriber's line AL2 is marked for the transfer of incoming calls to a manual board TV. For marking the transfer there is provided a rectifier E2, through which the test circuit is branched to a conductor *m1* that is common to a plurality of subscriber's lines, and a relay MR1 of the marker M1. When testing on the subscriber's line AL2 the relay MR1 will operate. A contact means 111 is actuated and a voice frequency signal is sent from the voice frequency generator G1 through contact means 111, units LV, LKR, GVB, GVA, SR, RSA, RSB to the register REG where the voice frequency receiver F1 is actuated and switches the circuits of the register. Due to this the initiated communication is disconnected. The marker M2 is connected again and a connection is established through the group selector stage GVA, GVB to a relay set CR which by means of its selector CV completes a telephone communication between the calling telephone instrument AL1 and the manual board TV.

The transfer service may be designed in different ways. Thus it is not necessary that the relay set CR directly connects the communication to the manual board TV. When relay set CR is called, for example, a translator CA will be connected and the number called from the instrument A1 is transmitted from the register REG to translator CA before the register is released and before the telephone communication between instrument A1 and relay set CR is established by the relay set SR. The translator CA can now transform the called number into another arbitrary calling number which is determined in a known manner by circuits within the translator CA. Then the selector CV is set by means of signals from translator CA to manual board TV or another traffic direction V in FIG. 1 and the new number can be transmitted to board TV or be directly called via a trunk in the traffic direction V.

Figure 2:
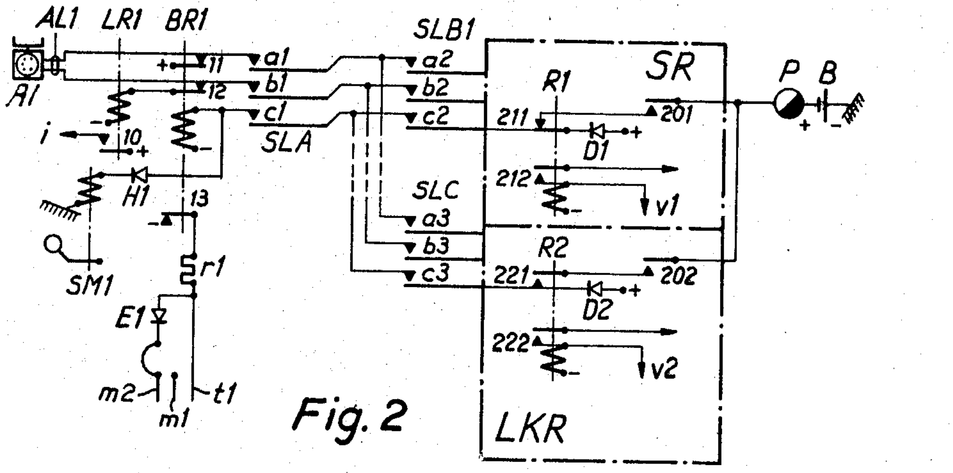
FIG. 2 shows circuits for call metering.

In FIG. 2 are shown a subscriber's line AL1 with a subscriber's instrument A1 and a line equipment comprising a line relay LR1 and a cut-off relay BR1. Furthermore, there is shown, the translator SM1, selectors SLA, SLB1 and SLC and relays R1 and R2 which also may be found in FIG. 1. An impulse mechanism P and an auxiliary battery B are used for the call metering. The subscriber's line AL1 is marked by means of the rectifier E1 so that calls to line AL1 are charged to the called subscriber instead of to the calling subscriber. If it is assumed that a call is connected from the instrument A2 to the instrument A1 a connection will be established through units SLA, SLB1, SR, GVA, GVB, LKR as has been described above. The marker M1 (FIG. 1) is connected to set LKR and is set for testing on the subscriber's line AL1. Here it is assumed that this line is free and the relay MR3 operates in a circuit extending through unit K, wire *s*1, resistance *r*1 and contact 13. Simultaneously the relay MR2 is energized through the rectifier E1 and the wire *m*2 and attracts its armature. The contact means 121 and 122 are actuated. A voice frequency signal from the voice frequency generator G2 is sent backwards to the register REG. The voice frequency receiver F2 is actuated and forwards the signal through the wire *v*1 to the relay set SR where the relay R1 operates. At the same time the relay R2 of the relay set LKR is operated in a circuit extending through the contact 122, selector LV and the wire *v*2. Then the connection is completed by the marker M1 connecting the relay set LKR to the line AL1 by the aid of the selectors SLA, SLB2 and SLC. Selector SLB2 is not shown in FIG. 2.

The switching of the call metering appears from FIG. 2. In response to an outgoing call from instrument A1 the line relay LR1 operates. The contact 10 is closed and via the wire *i* a calling identifier is actuated, and the call is connected to a register REG in a known manner. This process is of no interest for this invention. The line relay LR1 is disconnected from the line AL1 by the contacts 11 and 12 when the cut-off relay BR1 receives current from a relay set SR in the following circuit: voltage +, the rectifier D1, the contact *c*2 of selector SLB1, contact *c*1 of selector SLA, the winding of the cut-off relay BR to negative voltage (−). Upon answer from the called subscriber the contact 201 of set SR is closed by known processes and then the impulse mechanism P, at time intervals, connects the battery B for charging a period of conversation. The current impulses are sent through the contacts 201, 211, *c*2, *c*1, the rectifier H1, the winding of the subscriber's meter SM1, to ground.

Here it is assumed that a telephone communication has been connected to the instrument A1 in FIG. 2, for example from the instrument A2 in FIG. 1. The switching operation has been described above. The relay R1 of the relay set SR and the relay R2 of the relay set LKR have been operated when setting up the connection. The relays are held in the holding circuit by contacts 212 and 222 respectively. Contact 211 opens and contact 221 closes. When the called subscriber answers, this is marked in set LKR as well as in SET SR by closing the contacts 202 and 201 respectively.

During the call, impulses are transmitted to the subscriber's meter of the called subscriber A1 through the following circuit: for battery B; via impulse mechanism P, contacts 202, 221, *c*3, *c*1, rectifier H1, and winding of subscriber's meter SM1, to ground. In the relay set SR the circuit of call metering is interrupted by the contact 211.

I claim:

1. In an automatic telephone exchange which includes a plurality of terminals, at least some of said terminals being subscriber terminals, one of which being a calling subscriber terminal which calls another subscriber terminal, each of the subscriber terminals including a subscriber's line and a subscriber's line equipment, and links for carrying calls between the subscriber terminals, call-switching equipment comprising:

(a) selector means connected to the links for establishing connections between subscriber terminals;

(b) marker means for activating said selector means to establish specific connections between a pair of subscriber terminals;

(c) register means connected to the links for controlling said marker means to establish specific connections in accordance with calling signals from the calling subscriber terminal in the links;

(d) at least some of the subscriber's line equipments each comprising a marking circuit;

(e) said marker means further including relay means for testing the state of the marking circuit of the associated called subscriber terminal;

(f) means in said marker means under control of said relay means for sending a return control signal to the register means which controlled the routing of the call to the called subscriber terminal; and (g) return control signal receiving means in said register means receiving said return control signals for controlling said marker means to establish a connection between the calling subscriber terminal and a terminal other than the called subscriber terminal.

2. The automatic telephone exchange of claim 1 wherein calls are established by coded combinations of signals, further comprising a signal translator connected to said register means and responsive to the control signal receiving means thereof for receiving the coded combination of signals of an initiating call to the called subscriber terminal and translating said coded combination of signals to another coded combination of signals representing a different terminal, and means connected to said translator means and responsive to said other coded combination of signals for establishing a connection to said different terminal.

3. The automatic telephone exchange of claim 1 wherein each subscriber terminal further includes a subscriber meter, and means responsive to said control signal receiving means for preventing operation of the calling subscriber terminal's meter and activating the called subscriber terminal's meter.

4. The automatic telephone exchange of claim 1 wherein each subscriber terminal further includes a subscriber's meter, connections settable by said marker means comprising first and second link circuits, means in said first link circuit and operable by said return control signal receiving means to prevent operation of the calling subscriber terminal's meter, and means in said second link circuit and operable by said marker means to activate the called subscriber terminal's meter.

References Cited by the Examiner

UNITED STATES PATENTS

| | | | |
|---|---|---|---|
| 2,274,759 | 3/1942 | Wicks | 179—18.03 |
| 2,866,003 | 12/1958 | Walsh | 179—18.211 |

KATHLEEN H. CLAFFY, *Primary Examiner.*

H. ZELLER, *Assistant Examiners.*